United States Patent

Ohno et al.

[11] Patent Number: 5,972,465
[45] Date of Patent: *Oct. 26, 1999

[54] FASTENER MEMBER FOR MOLDING AND PRODUCTION OF PLASTIC MOLDED ARTICLE WITH FASTENER MEMBER MOLDED THEREON

[75] Inventors: Yuji Ohno; Kunihiko Shimamura, both of Kurashiki; Tohru Tanokura, Osaka, all of Japan

[73] Assignee: Kuraray Co., Ltd., Kurashiki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/872,547

[22] Filed: Jun. 10, 1997

Related U.S. Application Data

[62] Division of application No. 08/642,631, May 3, 1996, Pat. No. 5,688,576, which is a continuation of application No. 08/350,045, Nov. 29, 1994, abandoned.

[30] Foreign Application Priority Data

Nov. 29, 1993 [JP] Japan .................................... 5-325930

[51] Int. Cl.$^6$ .................................................. A44B 18/00
[52] U.S. Cl. ............................ 428/100; 428/99; 428/119; 24/442
[58] Field of Search ............................... 428/99, 100, 119, 428/120; 24/442, 443

[56] References Cited

FOREIGN PATENT DOCUMENTS 2423666 2/1978 France .
5211910 8/1993 Japan .

*Primary Examiner*—Alexander Thomas
*Attorney, Agent, or Firm*—Oblon, Spivak, McClelland, Maier & Neustadt, P.C.

[57] ABSTRACT

A fastener member for molding which is a fastener tape which includes engaging elements on a top side of its substrate and also includes ridges which extend in a longitudinal direction on both edges of a back side of the substrate. The ridges project outwardly such that its outermost part is about 0.3–5 mm from the outer edge of the substrate. A process for producing a plastic molded article having the fastener members molded thereon, comprises fitting the above-mentioned fastener member in the recess of a mold such that the engaging elements on its surface are directed to the recess of the mold and the ridges of the fastener member substantially seal the gap between the fastener member and the sidewall of the recess of the mold, and injecting a resinous composition into the mold.

14 Claims, 4 Drawing Sheets

FASTENER MEMBER FOR MOLDING AND PRODUCTION OF PLASTIC MOLDED ARTICLE WITH FASTENER MEMBER MOLDED THEREON

This is a Division of application Ser. No. 08/642,631 filed on May 3, 1996, now U.S. Pat. No. 5,688,576 which is a continuation of application Ser. No. 08/350,045, filed on Nov. 29, 1994, abandoned.

BACKGROUND OF THE INVENTION

1. Field of the Invention

The present invention relates to a fastener member for molding which is embedded in the surface of a cushion when an automotive seat cushion or office chair cushion is molded. The fastener member molded in the cushion is used to fix the upholstery material (such as cloth) covering the cushion.

2. Discussion of the Background

An automotive seat or office chair is usually made up of a cushion of foamed polyurethane or the like and an upholstery material covering it. According to conventional technology, the cushion has molded wires, and the upholstery is attached to the cushion by means of metal fixing members which engage the molded wires and the upholstery. This procedure is accomplished by the aid of an electric tool.

A new method utilizing insert molding has recently been proposed for the production of an automotive seat. This method involves the steps of inserting flat fastener tapes in the recesses of the mold, injecting a foaming resin into the mold, and expanding the resin such that the fastener tapes are integrally embedded in the surface of the cushion. The fastener tape has a large number of engaging elements on its top side and a large number of anchoring elements on its back side. The molded cushion, therefore, has the engaging elements bared on its surface. The cushion is finally covered with an upholstery material having elements capable of engagement with the engaging elements of the fastener tape.

The above-mentioned procedure needs a provision for preventing the foaming resin from entering the gap between the fastener tape and the recess of the mold in which it is fitted, because there is a possibility that the engaging elements are buried in the foamed resin that enters the gap.

This problem is solved by the use of a fastener member as shown in FIG. 9. The fastener member (A) is made up of a flat fastener tape (E), a steel strip (F), and a cover film (G). The flat fastener tape (E) has a large number of engaging elements (C) and anchoring elements (D) formed on both sides of its substrate. The steel strip (F), which is placed on the engaging elements (C), causes the fastener tape (E) to be attracted to the magnet (J) arranged in the recess of the mold. The cover film (G) covers the steel strip (F) and the engaging elements (C). The cover film (G) has its periphery bonded to the periphery of the flat fastener tape (E) by means of adhesion or heat sealing.

Prior to the molding operation, the fastener member (A) is fixed in position by the magnetic force exerted on the steel strip (F) by the magnet (J) arranged in the recess (K) of the mold. Subsequently, a foaming resin is injected into the mold so as to produce a cushion in which the anchoring elements are embedded. The cover film prevents the engaging elements from being buried in the foaming resin. After molding, the cover film (G) and the steel strip (F) are removed, so that the engaging elements (C) of the flat fastener are bared on the cushion.

Another fastener member of the molded-in type for the same purpose as mentioned above is disclosed in Japanese Patent Laid-open No. 64-9708/1989. It is a fastener tape having a groove on its entire periphery. It is fitted to the mold by the aid of the groove which is formed on the periphery of the recess in the mold, so that the fastener groove engages with the recess groove in the mold. Said prior art further discloses that the fastener tape has a flat rim outside the groove, and it seems that the fastener tape is fitted to the recess of the mold by the combination of the groove and the flat rim.

Another fastener member of molded-in type is disclosed in Japanese Utility Model Laid-open No. 3-58109/1991. It is a fastener tape having on its entire periphery a fitting member having a rectangular section. It has a disadvantage of being undesirably wide due to the fitting member. It has another disadvantage that the fitting member has to be formed separately from the flat fastener tape and then attached to the periphery of the flat fastener tape. This disadvantage leads to low productivity.

The above-mentioned method of attaching the upholstery to the cushion by the aid of molded wires and metal fixing members (so-called Hogring method) has the disadvantage of requiring a large number of metal fixing members and a great deal of labor. In addition, it poses a problem with safety and health e.g., wounds and tenosynovitis which results from using an electric tool for the metal fixing members. Another disadvantage is that the cushion after scrapping cannot be easily recycled because it contains metal parts such as wires and fixing members.

The fastener member shown in FIG. 9 has the disadvantage that it is necessary to remove the steel strip (F) and the fastener cover film (G) after molding. After removal, they are disposed of as waste. Another disadvantage is that the film (G) has to be completely removed with great care; even a small piece of film remaining on the engaging elements reduces the engaging force and aggravates the appearance. The removal of the film is troublesome and the removal of the steel strip (F) may injure the fingers.

The fastener member disclosed in Japanese Patent Laid-open No. 64-9708/1989 has the disadvantage of requiring a complex construction in both the fastener tape and the mold. The former has a groove on its periphery and the latter is provided with a grooved ridge which engages with the groove of the fastener tape. In addition, the groove increases the width of the fastener but has no engaging elements. This is undesirable especially in the case of narrow fasteners.

SUMMARY OF THE INVENTION

The present invention was completed to solve the above-mentioned problems. It is an object of the present invention to provide a fastener member for molding of plastic material. The fastener member is a fastener tape which is fixed to a recess in the mold prior to molding. It is designed such that its engaging elements are protected from being buried in the foaming resinous composition during molding. It offers an advantage of being small in size and being superior in productivity, safety, and workability. In addition, it permits the recycling of the cushion in which the fastener member is incorporated.

It is an object of the present invention to provide a fastener member for molding which comprises a fastener tape having engaging elements on the top side of its substrate and having ridges extending continuously in the longitudinal direction on both edges of the back side of the substrate, and the ridge projecting outward such that its outermost part is about 0.3 to 5 mm away from the outer edge of the substrate.

In an embodiment of the present invention, the fastener member as defined above may have the ridges formed by bending back both edges of the substrate of the fastener tape.

In another embodiment of the present invention, the fastener member as defined above may have an enlarged portion on the top of the ridges.

It is another object of the present invention to provide a fastener member for molding which is a fastener tape which is constructed as mentioned above and has anchoring elements on its back side. This structure provides better bonding between the molded article and the fastener member.

It is another object of the present invention to provide a fastener member to be embedded in a molded article by molding which is a fastener tape having engaging elements on the top side of its substrate and having ridges extending continuously in the longitudinal direction on both edges of the back side of its substrate, with the difference between the width of the outermost parts of both ridges and the width of the recess in the mold in the range of −1 to 5 mm, and the difference between the length of the fastener tape and the length of the recess in the mold in the range of −5 to 5 mm.

It is another object of the present invention to provide a process for producing a plastic molded article having fastener members molded thereon, said process comprising fitting the above-mentioned fastener member in the recess of the mold such that the engaging elements on its surface are directed to the recess of the mold and the ridges of the fastener member substantially seal the gap between the fastener member and the sidewall of the recess of the mold, and injecting a resinous composition into the mold.

Accordingly, the present invention relates to a fastener member for molding of plastic material. The fastener member comprises a fastener tape which includes a substrate. The fastener tape comprises engaging elements on a top side of the substrate and ridges extending continuously in a longitudinal direction on both edges of a back side of the substrate. The ridges project outwardly such that an outermost part of the ridges is about 0.3 to 5 mm from an outer edge of the substrate.

The present invention also relates to a fastener member to be embedded in a molded article by molding. The fastener member comprises a fastener tape including a substrate. The fastener tape comprises engaging elements on a top side of the substrate and ridges extending continuously in a longitudinal direction on both edges of the back side of the substrate. A difference between a width of the outermost parts of the ridges and a width of a recess in a mold in which the fastener tape is fitted is in a range of −1 to 5 mm, and a difference between a length of the fastener tape and a length of the recess in the mold is in the range of −5 to 5 mm.

The present invention further relates to a process for producing a plastic molded article having fastener members molded thereon. The process comprising the steps of providing a fastener tape including a substrate with engaging elements on a top side of the substrate, and ridges extending in a longitudinal direction on both edges of a back side of the substrate to form a fastener member; fitting the fastener member in a recess of a mold such that the engaging elements are directed towards the recess of the mold and the ridges substantially seal a gap between the fastener member and a side wall of the recess of the mold; and injecting a resinous composition into the mold.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
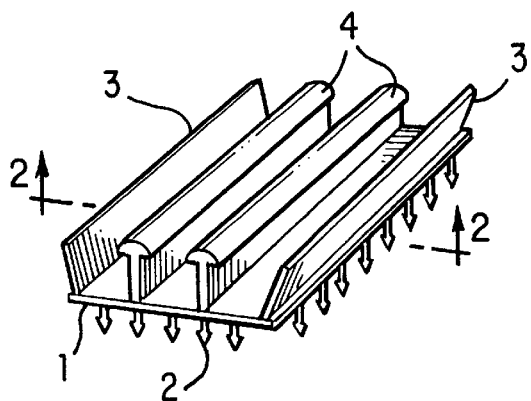
FIG. 1 is a perspective view showing an embodiment of the fastener member according to the present invention.
Figure 2:
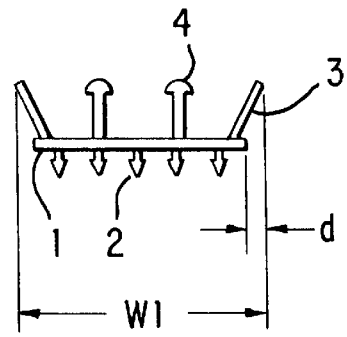
FIG. 2 is a sectional view of the fastener member taken along the line X—X in FIG. 1.

Referring now to the drawings, wherein like reference numerals designate identical or corresponding parts throughout the several views, FIG. 1 illustrates a perspective view of an embodiment of the fastener member pertaining to the present invention. FIG. 2 illustrates a sectional view taken along the line X—X of FIG. 1. The fastener member shown in FIGS. 1 and 2 is made up of a substrate (1), a large number of engaging elements (2) formed on the top side of the substrate, and ridges (3) extending continuously in the longitudinal direction on the edges of the back side of the substrate. The ridge (3) is constructed such that the outermost part thereof projects outward about 0.3–5 mm from the edge of the substrate (1). In the embodiment shown in FIG. 2, the ridge (3) protrudes a distance (d) from the edge of the substrate (1), and the magnitude of "d" is about 0.3–5 mm. The substrate may optionally be provided on its back side with anchoring elements (4).

Figure 3:
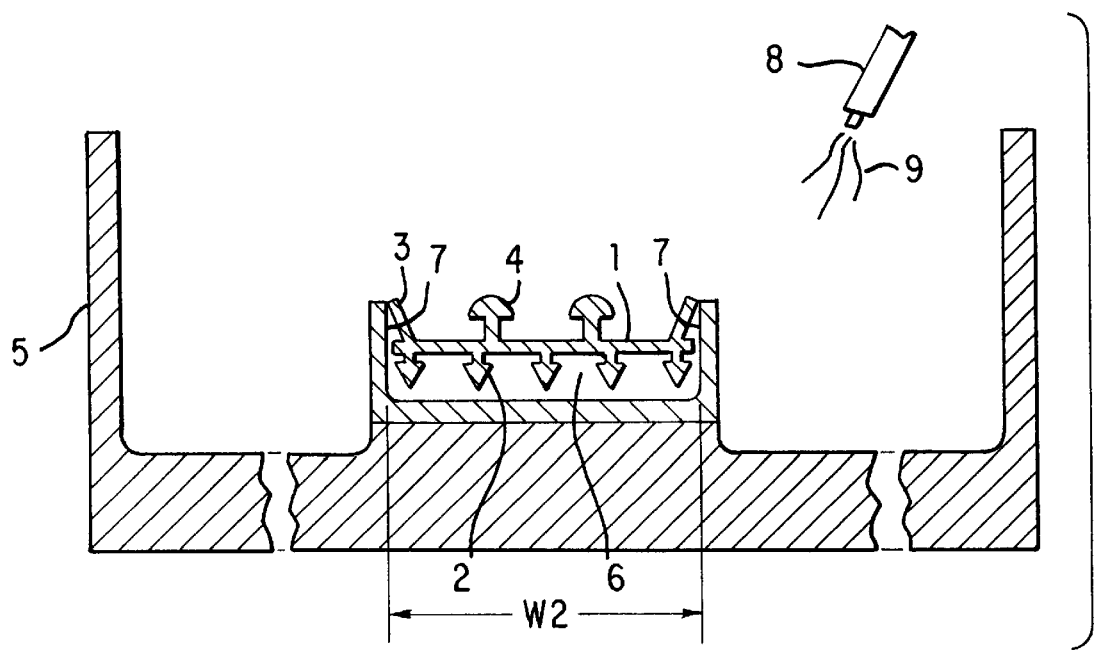
FIG. 3 is a schematic sectional view showing the fastener member fitted in the mold.

FIG. 3 is a schematic diagram showing how the fastener member shown in FIG. 1 is fitted in the recess (6) of the mold (5). The recess (6) has a width which is slightly smaller than or approximately equal to that of the fastener member. When the fastener member is fitted in the recess (6), the ridges (3) protrude outward from the edges of the substrate. Thus, the ridges (3) approach or touch the wall (7) of the recess (6), thereby substantially sealing the gap between them. This sealing isolates the engaging elements (2) from the molding material (9) injected by injecting member 8 into the mold afterward.

The ridges with the sufficiently large protrusion (d) firmly seals the gap owing to its resilience. In the present invention, the protrusion (d) should be about 0.3–5 mm. The magnitude of "d" depends on the width of the substrate. It may be greater than 5 mm for wider substrates. An excessively protruded ridge will deform the fastener member in the recess or make it difficult to fit the fastener member into the recess owing to its excessive resilience.

Figure 4:
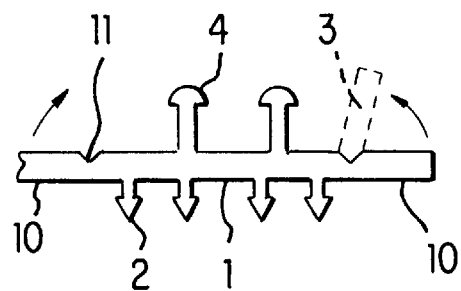
FIG. 4 is a sectional view illustrating the production of an embodiment of the fastener member of the present invention.
Figure 5:
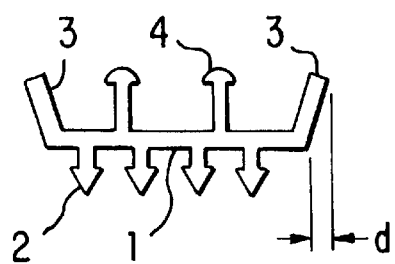
FIG. 5 is a sectional view of an embodiment of the fastener member of the present invention.

FIGS. 4 and 5 are schematic diagrams illustrating the process of producing one embodiment of the fastener members of the present invention. The fastener tape shown in FIG. 4 is made up of a substrate (1) and bend strips (10) extending from the edges of the substrate (1). The bend strips (10) are bent toward the back side of the substrate along the score (11) as shown in FIG. 4, so that they serve as the ridges (3). In the case of the fastener member shown in FIG. 5, the protrusion (d) should be about 0.3–5 mm and the magnitude of "d" may be adjusted by means of the score (11).

According to the present invention, the ridges (3) are formed on the back side of the substrate (1) and therefore they do not increase the width of the substrate or the fastener tape. This structure is of great advantage to a narrow fastener tape and permits the engaging elements to be formed on the entire surface of the fastener member. In addition, the fact that the ridges (3) are integrally formed with the fastener tape contributes to better productivity than in the case where the fitting elements are produced separately and attached to the fastener tape subsequently.

The fastener member of the present invention should be fitted in the recess of the mold in such a manner that there is no gap between the ridge of the fastener member and the wall of the recess. However, small gaps are permissible because the ridge is pushed against the wall of the recess to seal the gaps by the resinous composition injected into the mold. In addition, small gaps are permissible because a highly viscous resinous composition injected into the mold does not pass through them or passes them to a limited extent, and hence the engaging elements are isolated from the resinous composition. All of the above sealings are regarded as sealing in this invention.

The ridges on the fastener member should be formed such that a difference between the width of the outermost parts of both ridges (W1) and the width of the recess in the mold (W2) should be in the range of −1 to 5 mm, that is, W1-W2=−1 to 5 mm referring to W1 and W2 as shown in FIGS. 2 and 3. This requirement should be fulfilled so as to facilitate the fitting of the fastener member in the recess and prevent flowing of the resinous composition into the recess. The difference between W1 and W2 should preferably be −0.5 to 2 mm. If W1 is greater than W2 within the above-mentioned region, it is possible to effectively keep out the resinous composition because the fastener member undergoes elastic deformation to come into close contact with the wall of the recess.

At the time of molding, the fastener member of the present invention may pose a problem with the infiltration of the resinous composition through the gap between its longitudinal end and the wall of the recess in the same direction. However, this problem is not serious because the fastener member is much longer compared with its width. The length of the fastener tape is greater than 10 cm, preferably is several tens of centimeter, and the width is 7–50 mm, preferably 7–20 mm, and most desirably 10–15 mm. Therefore, the infiltration of the resin through the gap at the longitudinal end affects only a limited number of engaging elements and hence is permissible. Usually, the desired sealing is achieved if the fastener member is of almost equal length to the recess in the mold.

The difference between the length of the fastener member and the length of the recess in the mold should be in the range of −5 to 5 mm, preferably −2 to 2 mm. If it is smaller than −5 mm, there will be a large gap through which the resinous composition infiltrates to the engaging elements. If it is larger than 5 mm, the fastener member will be fitted in the recess of the mold with difficulty or will be deformed in the recess of the mold. A better sealing at the end of the fastener member may be accomplished by providing the end of the fastener member with a flat part or sealer which is fitted with a flat part formed in the middle of the wall of the recess.

Examples of the invention will be explained with reference to the accompanying drawings.

Figure 6:
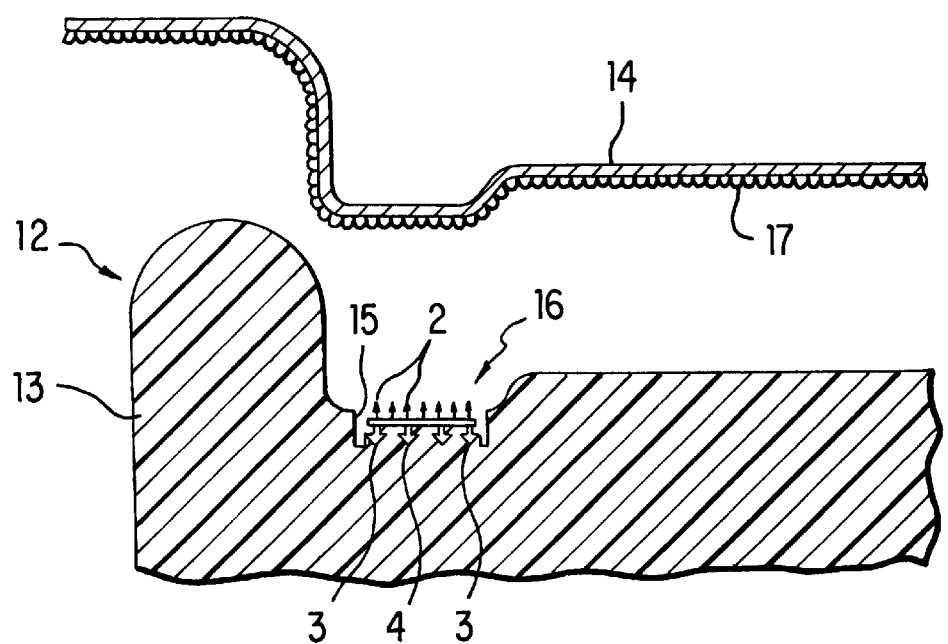
FIG. 6 is a partly sectional view showing an automotive seat cushion of an embodiment of the resin molded article according to the present invention.

FIG. 6 is a partly sectional view showing the structure of an automotive seat cushion as an example of the fastener member pertaining to the present invention. There is shown a seat (12) which is a molded cushion (13) of foamed polyurethane or the like. The cushion (13) is covered with an upholstery material (14). The cushion (13) has grooves (15) which may be formed in a [ shape on the seat of the cushion, and the fastener members (16) are embedded in the grooves by molding. The fastener member (16) has on its top side engaging elements and the upholstery material (14) is backed with a woven cloth or non-woven cloth having looped fibers, so that the engaging elements engage with the looped fibers of the upholstery material.

Figure 7:
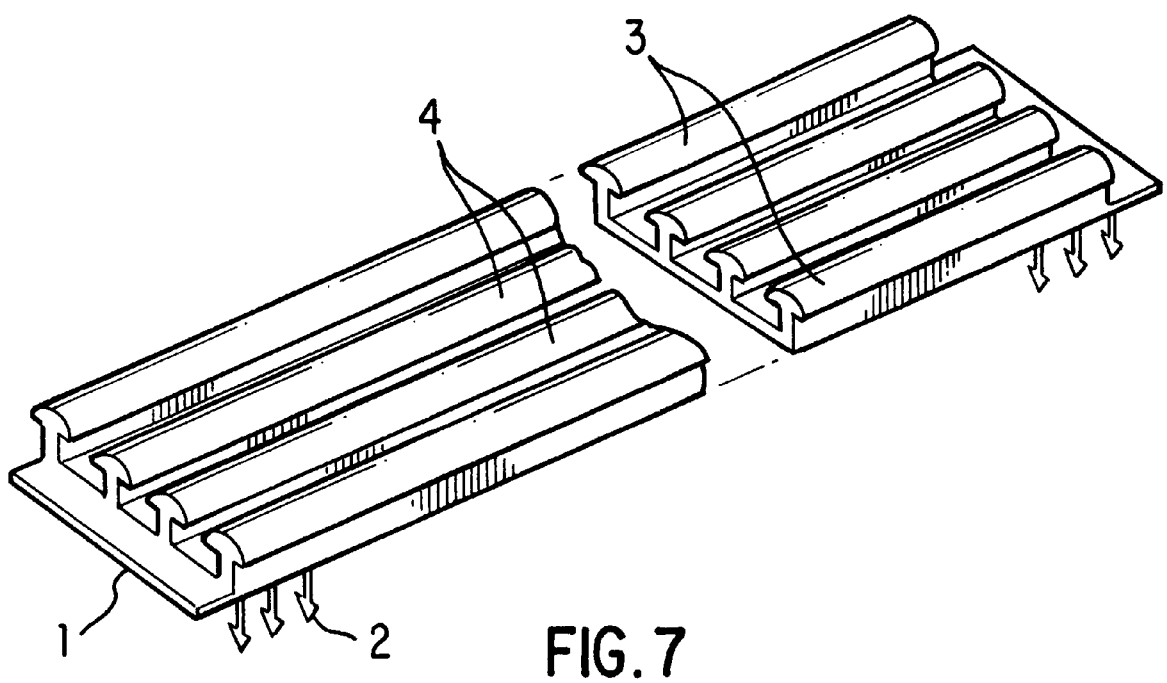
FIG. 7 is a perspective view of another embodiment of the fastener member of the present invention.

The embodiments of the fastener member (16) are shown in FIGS. 1, 5, or 7. The fastener member (16) has on its top side a large number of engaging elements (2) which engage with the upholstery material. The engaging element may take any shape such as a mushroom, hook, or arrowhead. The fastener member (16) should preferably have on its back side anchoring elements whose head has a section of arc or mushroom. However, they may be omitted if the substrate is narrow. In this case, the ridges protruding from the edges may function as the anchoring elements.

FIG. 7 is a perspective view showing another example of the fastener member of the present invention. The fastener member has on its back side two ridges (3, 3) protruding from the edges and two anchoring elements (4, 4) whose head has an arc section. The ridge (3) has its enlarged head, so that it firmly anchors in the molding resin. As a result, the fastener member is retained in the cushion without the possibility that the fastener member peels off at the edges. The anchoring elements (4) may be either of long continuous ridges in the longitudinal direction or of a large number of discrete elements like engaging elements.

Figure 8A:
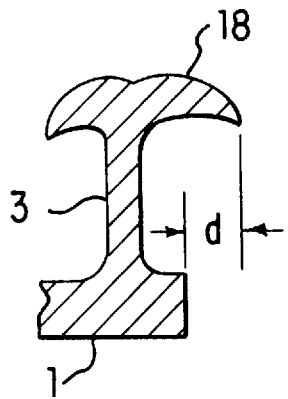
FIGS. 8(a), 8(b) and 8(c) are sectional views of further another embodiment of the fastener member, in particular shapes of the ridges on the back side of the fastener member, of the present invention.
Figure 8B:
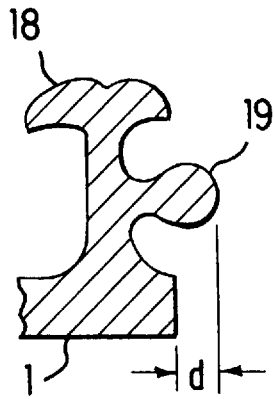
Figure 8C:
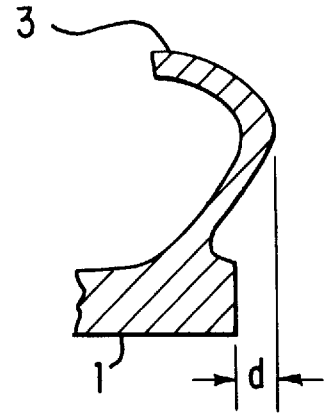
Figure 9:
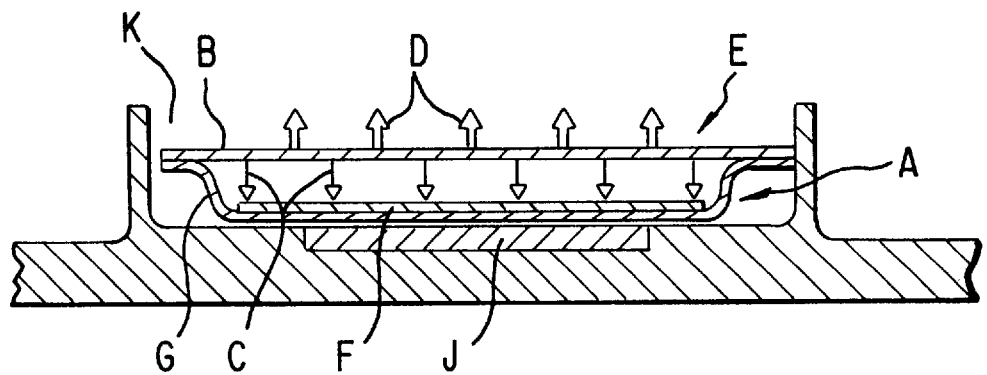
FIG. 9 is a sectional view showing the conventional fastener member, and an embodiment of placing the same in the mold.

The ridge (3) may have any shape, as shown in FIGS. 8(a), 8(b), and 8(c). The ridge (3) shown in FIG. 8(a) has an anchor-like head, with the right side of the head protruding outward by "d" from the edge of the substrate. The ridge (3) shown in FIG. 8(b) has a head (18) and a projection (19) at the middle, with the outermost side of the projection protruding outward by "d" from the edge of the substrate. The ridge (3) shown in FIG. 8(c) is curved outward such that the outermost part of the bend protrudes outward by "d" from the edge of the substrate.

The substrate of the fastener member varies in width according to its use. The width is usually 7–50 mm, preferably 7–20 mm, most desirably 10–15 mm. The fastener tape may be molded from any of polyolefin resin such as polyethylene and polypropylene, polyamide resin such as nylon, polyester resin, polyurethane resin, and polyvinyl chloride resin, alone or in combination.

No restrictions are imposed on the molding method of the fastener member. The well-known extrusion process may be employed. In this case, a thermoplastic resin is extruded through a die having slits for the substrate, ridges, and anchoring elements with such sections as shown in FIGS. 1, 4, 7, and 8(a)–8(c). After cooling the extruded tape, the tape is given cuts in the ridges on the top side at regular intervals in the longitudinal direction, by a rotary cutter set at an angle with respect to the longitudinal direction. The ridges on the back side are not given cuts.

The resulting tape is stretched in its longitudinal direction using drawing rolls so that the cut ridges on the top side become a large number of discrete engaging elements having an arrowhead-like cross section, while the ridges at the edges on the back side remain continuous. These ridges should be continuous so that they achieve sealing for the resinous composition.

The fastener member shown in FIG. 1 or FIG. 7 has ridges at the edges and anchoring elements which are formed directly by the extrusion die. In this case, it is difficult to give cuts only to the middle ridges standing between two ridges at the edges and hence it is difficult to provide the back side of the substrate with a large number of discrete anchoring elements. In the case of the flat fastener shown in FIG. 4, it is possible to provide the back side of the substrate with a large number of discrete anchoring elements, if the ridges are given cuts, with the bend strips unraised, and then the substrate is stretched.

It is not always necessary that the above-mentioned elements be the same in shape and cross section. No restrictions are imposed on the height of the engaging elements and anchoring elements. They are usually about 1 to 15 mm, preferably about 2 to 6 mm high.

The fastener member of the present invention may be produced by sticking the engaging elements into the substrate. In this case, the engaging element may take any shape such as a hook or arrowhead.

The production of an automotive seat cushion provided with the fastener member of the present invention is explained below. The fastener tape (1) as shown in FIG. 7 is placed in the recess (6) of the mold (5), as shown in FIG. 3, with the engaging elements (2) facing the recess and the ridges (3) and anchoring elements (4) facing the cavity of the mold.

The fastener tape (1) is placed in the recess such that the ridges touch or approach the side walls (7, 7) of the recess. In this way, the ridges seal the gap between the fastener member and the recess, thereby preventing the liquid foaming resinous composition from infiltrating into the recess during the introduction of the composition.

Then, the mold is filled with a foaming resin such as polyurethane which is subsequently allowed to foam and expand. After curing, the cushion (13) is discharged from the mold (5). The resultant cushion (13) has the fastener member (15) integrally embedded thereon. The engaging elements (2) are bared, without being buried in the foamed resin. The ridges and anchoring elements are embedded in the cushion (13), and hence the fastener member is firmly fixed to the cushion.

The resulting cushion (13) is covered with the upholstery material (14) as shown in FIG. 6, such that the engaging elements (2) catch the tiny loops (17) on the back side of the upholstery material (14). In this way the upholstery material (14) tightly fits to the cushion (13) in conformity with its configuration.

In the foregoing examples, the fastener member of the present invention was applied to the automotive seat cushion. However, its application is not limited to it, but available to many other shaped articles.

According to the present invention, the fastener member for molding can be securely fitted in the recess of the mold in a simple manner. It seals well the lengthwise gap between it and the recess, and this sealing prevents the resinous composition from infiltrating into the recess. The fastener member of the present invention can be made in a narrower size than the conventional one, and yet it can be provided with engaging elements on the entire surface of the fastener tape. Therefore, it permits the upholstery material to be fixed firmly with a narrow fastener. If the fastener member is embedded in a deep and narrow recess of the cushion, it is possible to tightly fix the upholstery material as if it were suspended by wires and metal fixing members. Thus, the upholstery material will give a good appearance. The fastener member is superior in productivity, safety, and workability, and it permits the recycling of the cushion in which it is embedded.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A fastener member for molding of plastic material, the fastener member comprising:

a fastener tape including a substrate, said fastener tape comprising engaging elements configured to engage upholstery provided on a top side of the substrate, said fastener tape further including ridges extending continuously in a longitudinal direction on both edges of a back side of the substrate, said back side of the substrate including anchoring elements configured to engage plastic material;

wherein the ridges project outwardly such that an outermost part of the ridges is about 0.3 to 5 mm from an outer edge of the substrate.

2. The fastener member for molding as defined in claim 1, wherein said engaging elements have a shape of at least one of a mushroom, hook or arrowhead.

3. The fastener member for molding as defined in claim 1, wherein said engaging elements are configured to engage with looped fibers of upholstery material.

4. A fastener member molding apparatus comprising:

a fastener tape including a substrate, said fastener tape comprising engaging elements on a top side of the substrate configured to engage upholstery and ridges extending continuously in a longitudinal direction on both edges of a back side of the substrate; and a mold having a recess with an open side facing an interior of said mold;

wherein a difference between a width of outermost parts of the ridges and a width of said recess in said mold in which the fastener tape is fitted is in a range of −1 to 5 mm, and a difference between a length of said fastener tape and a length of said recess in said mold is in the range of −5 to 5 mm.

5. The fastener member for molding as defined in claim 4, wherein said engaging elements are configured to engage with looped fibers of upholstery material.

6. The fastener member for molding as defined in claim 4, wherein said engaging elements have a shape of at least one of a mushroom, hook or arrowhead.

7. The fastener member for molding as defined in claim 4, wherein said recess is in the form of a channel, wherein said outermost parts of said recess include opposed faces connected by a bottom surface of said recess.

8. The fastener member for molding as defined in claim 4, wherein said recess is in the form of a channel, wherein said outermost parts of said recess include opposed walls extending from a bottom surface of said mold towards said interior of said mold, said opposed walls connected by a bottom surface of said recess.

9. A fastener member for molding of plastic material, the fastener member comprising:

a fastener tape including a substrate, said fastener tape comprising engaging elements extending from a top side surface of the substrate for attachment of the fastener tape to loop fibers of an upholstery material, and sealing ridges extending continuously in a longitudinal direction on both edges of a back side surface of the substrate which is opposite to the top side surface of the substrate;

wherein the ridges project outwardly from the back side surface of the substrate in a direction away from a center of said substrate, such that an obtuse angle which faces the center of the substrate is defined between the back side surface of the substrate and each of said sealing ridges and an outermost part of the sealing ridges is about 0.3 to 5 mm from an outer edge of the substrate.

10. The fastener member for molding as defined in claim 9, wherein said engaging elements have a shape of at least one of a mushroom, hook or arrowhead.

11. A fastener member to be embedded in a molded article by molding, the fastener member comprising:

a fastener tape including a substrate, said fastener tape comprising engaging elements extending from a top side surface of the substrate for attachment of the fastener tape to loop fibers of an upholstery material, and sealing ridges extending continuously in a longitudinal direction on both edges of a back side surface of the substrate which is opposite the top side surface of the substrate, said sealing ridges extending from the back side surface of said substrate in a direction away from a center of said substrate, such that an obtuse angle which faces the center of the substrate is defined between the back side surface of said substrate and each of said sealing ridges;

wherein a difference between a width of outermost parts of the ridges and a width of a recess in a mold in which the fastener tape is fitted is in a range of −1 to 5 mm, and a difference between a length of the fastener tape and a length of the recess in the mold is in the range of −5 to 5 mm, said sealing ridges extending in a direction toward a wall of the recess so as to substantially seal a gap between the sealing ridges and the wall of the recess.

12. The fastener member for molding as defined in claim 11, wherein said engaging elements have a shape of at least one of a mushroom, hook or arrowhead.

13. The fastener member for molding as defined in claim 11, wherein said recess is in the form of a channel, wherein said outermost parts of said recess include opposed faces connected by a bottom surface of said recess.

14. The fastener member for molding as defined in claim 11, wherein said recess is in the form of a channel, wherein said outermost parts of said recess include opposed walls extending from a bottom surface of said mold towards said interior of said mold, said opposed walls connected by a bottom surface of said recess.

\* \* \* \* \*